Patented Apr. 19, 1938

2,114,541

UNITED STATES PATENT OFFICE 2,114,541

PREPARATION OF WATER-SOLUBLE ALKALINE EARTH METAL SALTS OF ACETYLSALICYLIC ACID

Clemmy O. Miller and Arthur E. Siehrs, Chicago, Ill.

No Drawing. Application July 5, 1935, Serial No. 29,920

8 Claims. (Cl. 260—107)

Our invention relates to the production of water-soluble alkaline earth metal salts of acetylsalicylic acid, as for example calcium acetylsalicylate; to the production of mixtures of acetylsalicylic acid and an appropriate alkaline earth metal compound such that the alkaline earth metal salt of acetylsalicylic acid will be formed when brought into contact with an ionizing medium; and to water-insoluble mixtures of acetylsalicylic acid and alkaline earth metal compounds.

An object of our invention is to obtain acetylsalicylic acid in a water-soluble form. A further object of our invention is to incorporate an alkaline earth metal ion with an acetylsalicylic acid residue in such a way that each enhances the therapeutic value of the other.

The analgesic properties of acetylsalicylic acid are well known. Medical literature contains statements with supporting data to the effect that water-soluble acetylsalicylic acid providing substances act more quickly and effectively than does acetylsalicylic acid and that simultaneous administration of an alkaline earth ion with acetylsalicylic acid either as a salt or as a mixture enhances the therapeutic action of the other.

The present art of making calcium acetylsalicylate generally consists in either reacting acetylsalicylic acid with calcium oxide or calcium hydroxide and recovering the product or by reacting acetylsalicylic acid with a water-soluble calcium salt in the presence of some alkali to neutralize the acid formed in the reaction. Calcium acetylsalicylate, being a salt of a strong base and a weak acid containing an ester group, is unstable in water and hydrolyzes to give a mixture of calcium acetate and calcium salicylate. Hydrolysis proceeds more readily in alkaline solutions than in neutral or acid solutions. The higher the pH, the more rapid is the hydrolysis. It is desirable not to have calcium salicylate present in the product. Hence, it is desirable to carry out the reaction whereby calcium acetylsalicylate is produced as quickly and at as low a pH as possible. Our invention makes this possible.

Our invention consists essentially in bringing together acetylsalicylic acid and a polyhydroxyalcoholate of an alkaline earth metal in an ionizing solvent whereby a chemical reaction takes place with the formation of an alkaline earth metal salt of acetylsalicylic acid. The alkaline earth metals include calcium, magnesium, strontium and barium. By polyhydroxy-alcohols we means organic compounds that contain two or more alcohol groups, as for example, glycerol, mannitol, glucose, fructose, sucrose, maltose, etc. The organic compound may contain other reactive groups besides the alcohol groups.

We will now describe in detail how our invention may be used to produce acetylsalicylic providing substances.

I. 380 parts of calcium sucrate, containing 10.5 per cent of calcium is dissolved in 950 parts of water at about 20° C., 360 parts of acetylsalicylic acid is dissolved in 950 parts of methyl alcohol. The two solutions are thoroughly mixed, whereupon calcium acetylsalicylate precipitates. The product is separated from the solution by any convenient process, such as filtration, decantation, etc., and thoroughly dried. Although other proportions of methyl alcohol, and water, calcium sucrate and acetylsalicylic acid may be used without changing essentially the process, we have found these proportions to be satisfactory. We prefer to use as low a temperature as convenient, between 0° C. and 50° C., since at increased temperatures, as for example 70° C., acetylsalicylic acid is rapidly hydrolyzed to give salicylic acid and acetic acid or their salts. Also there is a tendency for calcium sucrate to change into a less soluble form. Other solvents for acetylsalicylic acid may be used instead of methyl alcohol providing they are sufficiently soluble in water, as for example ethyl alcohol, acetone, etc. We prefer to use a solvent that is soluble with water in all proportions. The pH of the solution in which the reaction takes place must be maintained above approximately 7 to avoid decomposition of the calcium sucrate, and less than approximately 14.

II. 418 parts of calcium sucrate containing 19.1 per cent calcium, is dissolved in 1900 parts of water. 720 parts of acetylsalicylic acid is dissolved in 1900 parts of methyl alcohol. The two solutions are mixed thoroughly at about 20° C., whereupon calcium acetylsalicylate precipitates. The product is treated as previously described and the conditions under which the reaction is carried out may be varied as previously indicated.

An advantage in using one of the calcium sucrates to react with acetylsalicylic acid to form calcium acetylsalicylate over the use of the calcium compounds known to the art, is that no acid forms during the reaction to hinder the completion of the reaction and it is not necessary to add a strong base to neutralize the acid and thus facilitate the decomposition of the acetylsalicylic acid portion to give salicylates.

The acetylsalicylates of the other alkaline earth metals may be prepared by similar methods, the appropriate chemical proportions being used and due consideration given to the solubilities of the respective compounds. We include as part of our invention, the use of other polyhydroxyalcohols, such as mannitol, glycerol, etc. In general, the more hydroxyl groups that are present in the molecule, the more convenient is the corresponding alkaline earth metal compound to use. As for example, calcium sucrate is much more convenient to use than calcium glycerate. Sucrose contains eight hydroxyl groups in each molecule. Calcium ions react with sucrose to form several different calcium sucrates. Unless otherwise designated, by calcium sucrate we mean any of these compounds.

Also, we claim as our invention, the process of intimately mixing acetylsalicylic acid with any alkaline earth metal sucrate in such a way that, when placed in an ionizing medium, the corresponding alkaline earth metal salt of acetylsalicylic acid is formed, or acts therapeutically as though the corresponding alkaline earth metal salt was formed, for one of the objects of our invention is to provide a means whereby acetylsalicylic acid may be administered with an alkaline earth ion in an effective manner.

By "bringing together", as used in the specification, we mean producing such an intimate mixture of acetylsalicylic acid and the alkaline earth containing substance such that when the mixture is brought into contact with an ionizing solvent, such as water, alcohol, and the like, a chemical reaction takes place forming the alkaline earth salt of acetylsalicylic acid.

We claim as our invention:

1. The process of reacting acetylsalicylic acid and an aliphatic polyhydroxyalcoholate of an alkaline earth metal and recovering the product thus formed.

2. The process of reacting acetylsalicylic acid and an aliphatic polyhydroxyalcoholate of an alkaline earth metal in an inert ionizing solvent at a temperature between approximately 0° C. and 50° C. to produce the alkaline earth salt of acetylsalicylic acid, and recovering said salt.

3. The process of producing an alkaline earth metal salt of acetylsalicylic acid, which comprises combining a solution of an aliphatic polyhydroxyalcoholate of an alkaline earth metal with a solution of acetylsalicylic acid at a temperature between approximately 0° C. and 50° C. and recovering the product thus formed.

4. The process of producing an alkaline earth metal salt of acetylsalicylic acid, which comprises combining an aqueous solution of an aliphatic polyhydroxyalcoholate of an alkaline earth metal with a solution of acetylsalicylic acid in an organic solvent miscible with water, and recovering the product thus formed.

5. The process of producing calcium acetylsalicylate, which comprises combining a water solution of calcium sucrate with a methyl alcohol solution of acetylsalicylic acid and recovering the precipitate.

6. As a new composition of matter, a mixture of acetylsalicylic acid and an aliphatic polyhydroxyalcoholate of an alkaline earth metal.

7. As a new composition of matter, a mixture of acetylsalicylic acid and calcium sucrate.

8. The process of reacting acetylsalicylic acid and calcium sucrate in an inert ionizing solvent at a temperature between approximately 0° C. and 50° C. to produce calcium acetylsalicylate.

CLEMMY O. MILLER.
ARTHUR E. SIEHRS.